US 6,601,074 B1

(12) United States Patent
Liebenow

(10) Patent No.: US 6,601,074 B1
(45) Date of Patent: Jul. 29, 2003

(54) EPISODE IDENTIFICATION

(75) Inventor: Frank Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/471,843

(22) Filed: Dec. 23, 1999

(51) Int. Cl.[7] ............................................. G06F 17/30
(52) U.S. Cl. ...................... 707/104.1; 704/219; 725/39; 725/44; 386/83; 345/327
(58) Field of Search .......................... 704/219; 705/26; 386/83; 345/327; 725/39, 44; 707/104.1

(56) References Cited

U.S. PATENT DOCUMENTS

| | | |
|---|---|---|
| 5,189,630 A | 2/1993 | Barstow et al. |
| 5,485,518 A | 1/1996 | Hunter et al. |
| 5,598,276 A | 1/1997 | Cookson et al. |
| 5,682,511 A | 10/1997 | Sposato et al. |
| 5,686,954 A | 11/1997 | Yoshinobu et al. |
| 5,751,335 A | 5/1998 | Shintani |
| 5,751,372 A | 5/1998 | Forson |
| 5,812,123 A * | 9/1998 | Rowe et al. ................. 345/327 |
| 5,956,455 A * | 9/1999 | Hennig ......................... 386/83 |
| 6,002,394 A * | 12/1999 | Schein et al. .................. 725/39 |
| 6,018,372 A * | 1/2000 | Etheredge ..................... 725/44 |
| 6,131,086 A * | 10/2000 | Walker et al. ................. 705/26 |
| 6,209,028 B1 * | 3/2001 | Walker et al. ............... 709/219 |
| 6,215,951 B1 * | 4/2001 | Hailey .......................... 386/83 |

* cited by examiner

Primary Examiner—Charles Rones
(74) Attorney, Agent, or Firm—William J. Breen, III; Mark S. Walker

(57) ABSTRACT

A method, system, signal and software which maintains an electronic program guide (EPG) that includes episode identifiers associated with program information. The method includes keeping a database of selected information and using the information in the database to specify programs or actions associated with specified programs. These programs may include, but are not limited to, recording a program that has not been previously recorded, or re-recording a program of lesser recording quality or reproduction quality if a better quality recording can be made.

6 Claims, 4 Drawing Sheets

EPISODE IDENTIFICATION

TECHNICAL FIELD OF THE INVENTION

The present invention relates generally to systems using program information and, more particularly, to systems, software programs, signals and methods using electronic program guides.

BACKGROUND OF THE INVENTION

Current systems using program information, including those employing electronic program guides (EPGs), do not contain identifiers specifically designed to differentiate between episodes of a program. When using these systems, for example, to periodically record a series or episodic program, a user must select the daily or weekly time slot of a program and set his system to record that program every time it airs. Sometimes one of these programs' series or episodes will have previously aired, and the user will have recorded it at that time. If this is the case, it is likely that the user will not want a duplicate recording. With currently available technology, the only way a user can avoid recording the unwanted episode is to bypass the periodic record function and tediously enter the individual air date and time of each program. If a method could be developed that maintained episode identification information and maintained a database that could hold information about previously recorded programs, then a user could employ a periodic record function and not worry about inadvertently recording duplicate programs.

Therefore, what is needed is a system, software program, signal, and method for maintaining episode identification information associated with program information and maintaining a database that can be used to specify programs for possible further action without additional user intervention.

SUMMARY OF THE INVENTION

Accordingly, the present invention provides a method, in a system using program information, comprising the actions of maintaining episode identification information associated with the program information, and identifying, using the episode identification information, a particular episode and its program information.

Furthermore, the present invention provides a signal embodied in a propagation medium for use in a system using program information that includes at least one instruction capable of maintaining episode identification information associated with the program information. The program of instructions also includes at least one instruction capable of identifying a particular episode and its program information using the episode identification information.

In addition, the present invention provides a system employing program information. The system comprises at least one processor, memory operably associated with the processor, and a program of instructions configured to be executed by the processor and stored in the memory. The program of instructions includes instructions capable of maintaining episode identification information associated with the program information and identifying, using the episode identification information, a particular episode and its program information.

It is an object of the present invention to provide a method of identifying episodes of series programs and storing at least the episode information in a database that can then be used to specify programs for possible future actions.

An advantage of the present invention is that it allows a user to employ a periodic record function of his system without inadvertently recording a copy of a previously recorded program. This will result in the user not wasting media storage space and avoiding unwanted multiple copies of the same program.

Another advantage of the present invention is that it frees a user from having to research the contents of each episode of a program in order to determine whether he has already recorded that particular episode and then having to selectively program his system for each occurrence of the programs that he wishes to record.

The present invention is also advantageous in providing a record, stored in a database, of previously recorded programs. In this way, a user does not need to rely on either his memory or some sort of manual record to determine which programs have been recorded.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration, specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
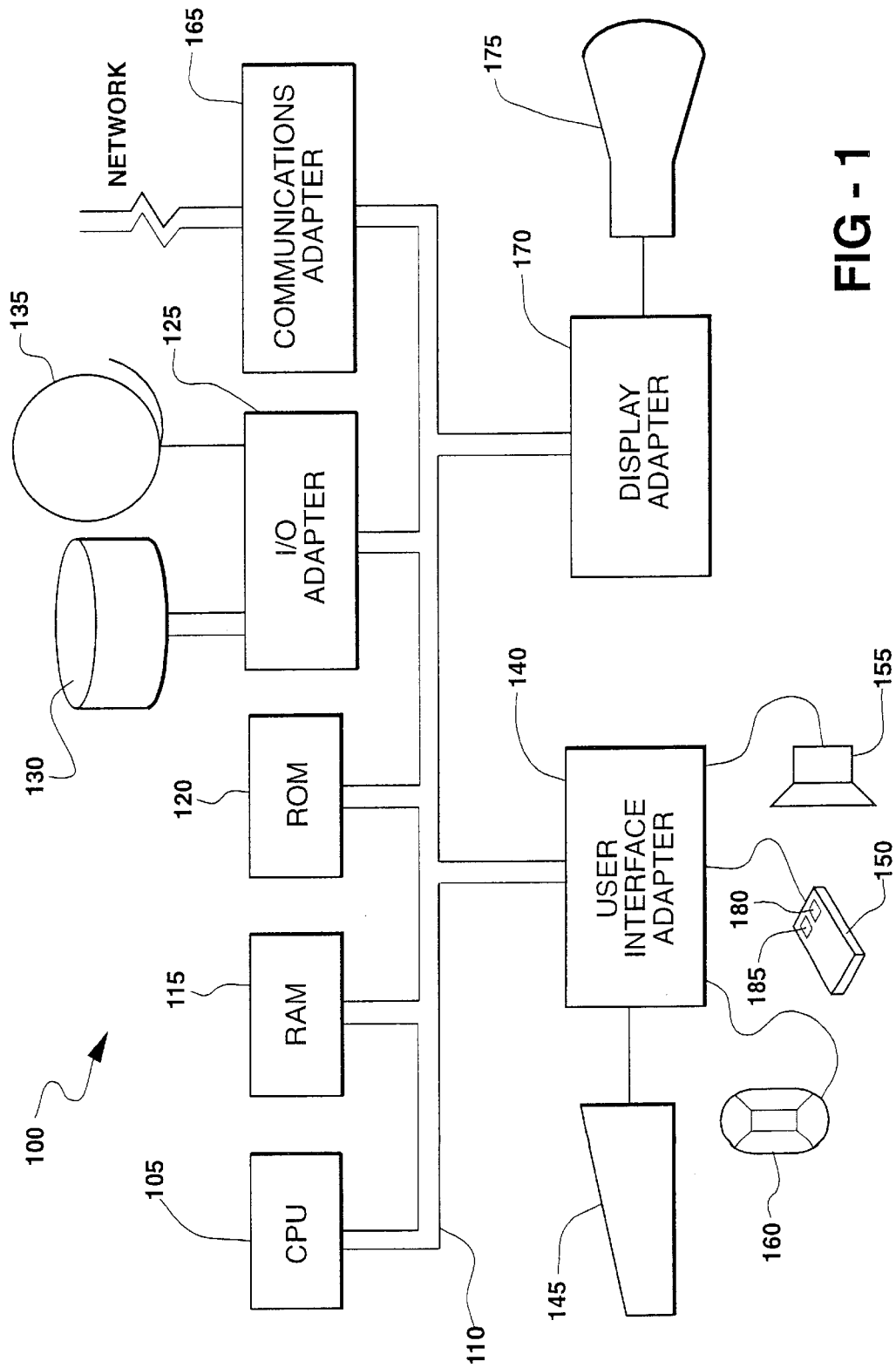
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read-only memory (ROM) 120 wherein the ROM 120 could also be erasable programmable read-only memory (EPROM) or electrically erasable programmable read-only memory (EEPROM), and input/output (I/O) adapter 125 for connecting peripheral devices such as disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 100 to an information network such as the Internet, and display adapter 170 for connecting system bus 110 to a display device such as monitor 175. Mouse 150 has a series of buttons 180, 185 and is used to control a cursor shown on monitor 175.

Figure 2:
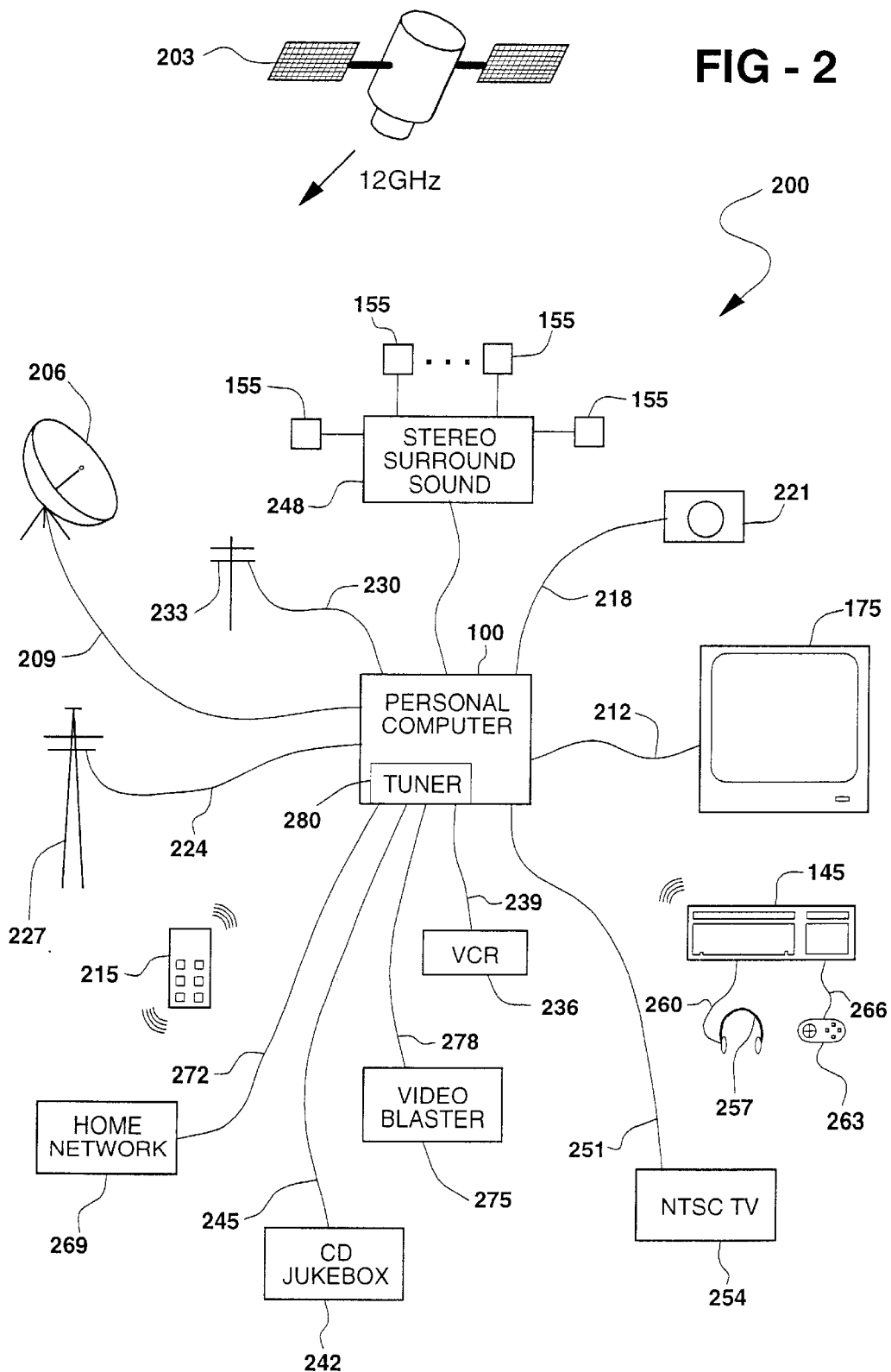
FIG. 2 illustrates a detailed block diagram showing a convergence system according to the preferred embodiment of the present invention.

Referring next to FIG. 2, a system 200 is shown in general detail. Reference numerals or letters in FIG. 2 which are like, similar, or identical to the reference numerals or letters of FIG. 1 indicate like, similar, or identical components or features. External to system 200 is satellite 203 which, in one preferred embodiment, is a HS601 model operated by Hughes at a 101 degree west longitude geosynchronous orbital location. Satellite 203 transmits signals comprising 150 channels of modulated digital video, audio, and data at a frequency of about 12 Ghz. The satellite signals are received by system 200 by antenna 206 containing a low noise block converter amplifier. Antenna 206 is preferably about 18 inches in diameter and receives left-and right-hand circularly polarized signals between 12.2 and 12.7 Ghz. Antenna 206 provides a "down converted-spectrum" signal between 950 and 1450 MHZ via a coaxial cable or other suitable communication medium 209 to information handling system 100, such as a personal computer or other system or circuitry capable of processing data. Suitable antennas 206 are already being manufactured and sold by RCA corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable 212 to drive large screen data quality monitor 175 suitable for viewing in a family room or entertainment room environment. System 100 provides for user input by means of remote controls 215 and 145. Remote control 215 comprises a hand-held size device with standard television controls and a numeric keypad and, in one embodiment, video cassette recorder (VCR) controls and a pointing device. It provides radio frequency (RF) or infrared (IR) control signals received by system 100. Remote control 145 is a full function personal computer keyboard with additional standard television and VCR controls, a pointing device which is preferably in the form of a touchpad, and it also provides RF control signals to system 100. RF control signals were selected over IR or hardwired in one embodiment due to the home entertainment environment. Monitor cable 212 is a standard type cable typically used on VGA display devices and comprises up to 15 electrical conductors interfacing with monitor 175 in a D-series shell connector. In one embodiment, full multimedia sourcing and destinationing of audio/video/data (A/V/D) broadcast are provided for. Although the embodiment presented herein discusses the use of VGA signals, it should be mentioned that with an appropriate change in hardware, National Television Standard Committee (NTSC) compliant signals and NTSC compliant hardware will employ the present invention in the manner mentioned herein.

Information handling system 100 may include a tuner, tuner circuitry 280, or card capable of both tuning to multiple channels and receiving television information or signals in the form of the NTSC or Phase Alteration Line (PAL) form from any medium 116 carrying signals from satellite dish 206 which provides digital A/V/D signals from such sources as DirecTV or Primestar (DirecTV is a trademark of DirecTV, Inc., and Primestar is a trademark of Primestar Partners, L.P.). In another such embodiment, the signals carried on medium 209 provide analog A/V such as NTSC antenna signals. In another such embodiment, the signal carried on medium 218 from camera 221 provides analog A/V such as NTSC audio/video signals. In further embodiments, the signal carried on medium 224 from cable-data source 227 provides analog and/or digital A/V/D. In further such embodiments, the signal carried on medium 230 from Public Switched Telephone Network (PSTN) 233 provides data or phone signals such as integrated services digital network (ISDN) or plain old telephone system (POTS) signals. In one set of such embodiments, system 100 is programmed to automatically record analog signals, such as television programming, onto recordable media, such as a video tape in VCR 236 coupled to cable 239. In another such set of embodiments, system 100 is programmed to automatically record digital signals, such as digital television programming, Digital Versatile Disk (DVD) programming, or compact disk read-only memory (CD-ROM) type audio, onto recordable media, such as recordable compact disks, in CD/DVD jukebox 242 coupled to cable 245. CD/DVD jukebox 242 also plays CDS, CD-ROMs or DVDs for use elsewhere. In another such embodiment, signals are sent to stereo surround system 248 for audio output to one or more speakers 155, and on cable 251 to TV 254. In one such embodiment, earphones 257 on cable 260 and game pad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 153 can be wired coupling or wireless, such as RF or IR.

One example of convergence system 200 is the Destination System using the DestiVu user or media interface manufactured and sold by Gateway 2000, Inc. In this manner, convergence system 200 is a fully functional computer integrated with a television providing TV viewing (via broadcast, cable, satellite, VCR, digital disk, or other broadcast media) and personal computing functionality. This convergence of computer and television enables a user combined access to both television programs and information and computer related functionality such as computer information and programs and Internet access.

Although many of today's televisions employ many of the same hardware resources employed by computers, such as information handling system 100, it is possible that the present invention might be practiced in other electronic devices or networked electronic devices. For example, with the development of audio/video networking, such as the recently proposed HAVi standard, television sets or other audio/video devices, such as audio/video receivers and VCRs, that do not themselves contain such resources could implement the present invention by using the resources of other devices on a network.

Figure 3:
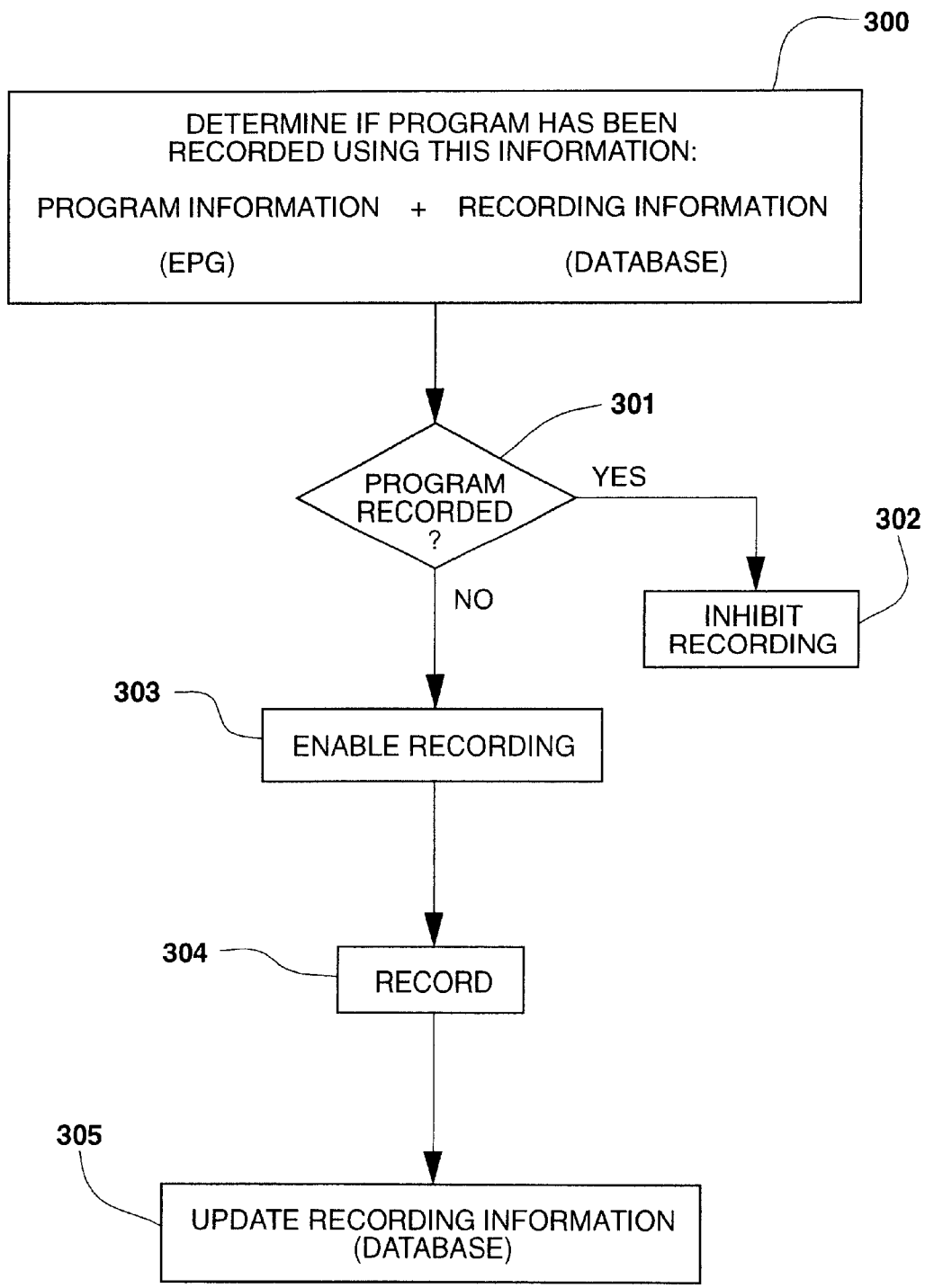
FIG. 3 illustrates a flowchart of a method according to the preferred embodiment of the present invention.

Refer next to FIG. 3, which is a flowchart for a method according to the preferred embodiment of the present invention. Prior to entering the flowchart, it is presumed that a user has configured his system to periodically record a series or episodic program using program information that can be obtained, for example, from an electronic program guide (EPG), which is data that may be received, for example, by an audio/video device as information within the broadcast vertical blanking interval, or by a convergence system as a digital data stream. The system described in the preceding paragraphs could be configured for periodic recording using any of the system input devices, including the keyboard 145, the remote control 215, or the VCR 236; or it could possibly be configured from another physical location via a phone line 233 or a satellite connection 206.

It is also presumed that the present invention is realized in a system using program information. The program information should contain enough information to differentiate between episodes of a series or episodic program. This could be accomplished by appending an episode identifier to the program information associated with each program. In the preferred embodiment of this invention, each episode of a particular program, for example "Seinfeld," would have a two-or three-digit identifying number appended to its program information that would uniquely identify it, for example, episode three's identifier could be "03." If a program were not episodic, its episode identifier could be, for example, "00" or another specially assigned number.

At some point shortly before a program to be recorded begins, the step 300 of determining whether or not the program has been previously recorded, must take place. The determination is made by comparing program information, possibly obtained from an EPG, with information associated with the program information. The information associated with the program information includes recording information that is stored in a database. The recording information could include, but would not be limited to, some subset of the program information related to previously recorded programs and additional information that would be helpful to the user. The database could be held in the RAM 115, a mass storage device 130 or 135, or even be stored at a remote location that is accessible to the system via phone lines or satellite. In a preferred embodiment of the present invention the database would hold the title and episode number of all previously recorded programs. For example a local database may appear as follows:

Seinfeld 27, 28, 42, 51

Friends 1, 3, 15.

Alternative embodiments may also include information related to previously recorded programs, such as the date and time of recording and the length of each program, as well as, in particular, information related to the recording or reproduction quality of the stored copies of the previously recorded programs. Information related to recording or reproduction quality of a copy of a program may include information regarding the source of the program (e.g. broadcast, cable, satellite, VCR, etc.), the storage medium used, the recording device used, the location of the stored copy, and available playback devices for the stored copy.

If the program has not been previously recorded, a decision is made to record the program. In some embodiments that include information related to recording or reproduction quality, a decision may be made to record a program that has been previously recorded, if it is possible to record a copy with a higher recording or reproduction quality that the previously recorded copy.

Once it has been determined, in step 300, whether the program has been previously recorded, a decision is made in step 301 whether to record the program or not. If the decision is made to record the program, then recording is enabled in step 303. Otherwise, recording of the program is inhibited in step 302. In the preferred embodiment of the present invention, enabling or inhibiting recording of the program can be accomplished with the interface capabilities of the personal computer 100. Other embodiments, wherein the enable/inhibit functions are implemented using circuitry separate from the dedicated interface functions of the personal computer 100, will be understood to one skilled in the art. After recording is enabled, step 304 records the program. In one embodiment of the present invention, the VCR 236, or one of the other recording formats detailed earlier, will record the program. The final step 305 in implementing the preferred method of this invention is having the system update the database with recording information associated with the recorded program. As those skilled in the art will appreciate, updating the database could be performed prior to the recording step 304 or during the recording process.

Figure 4:
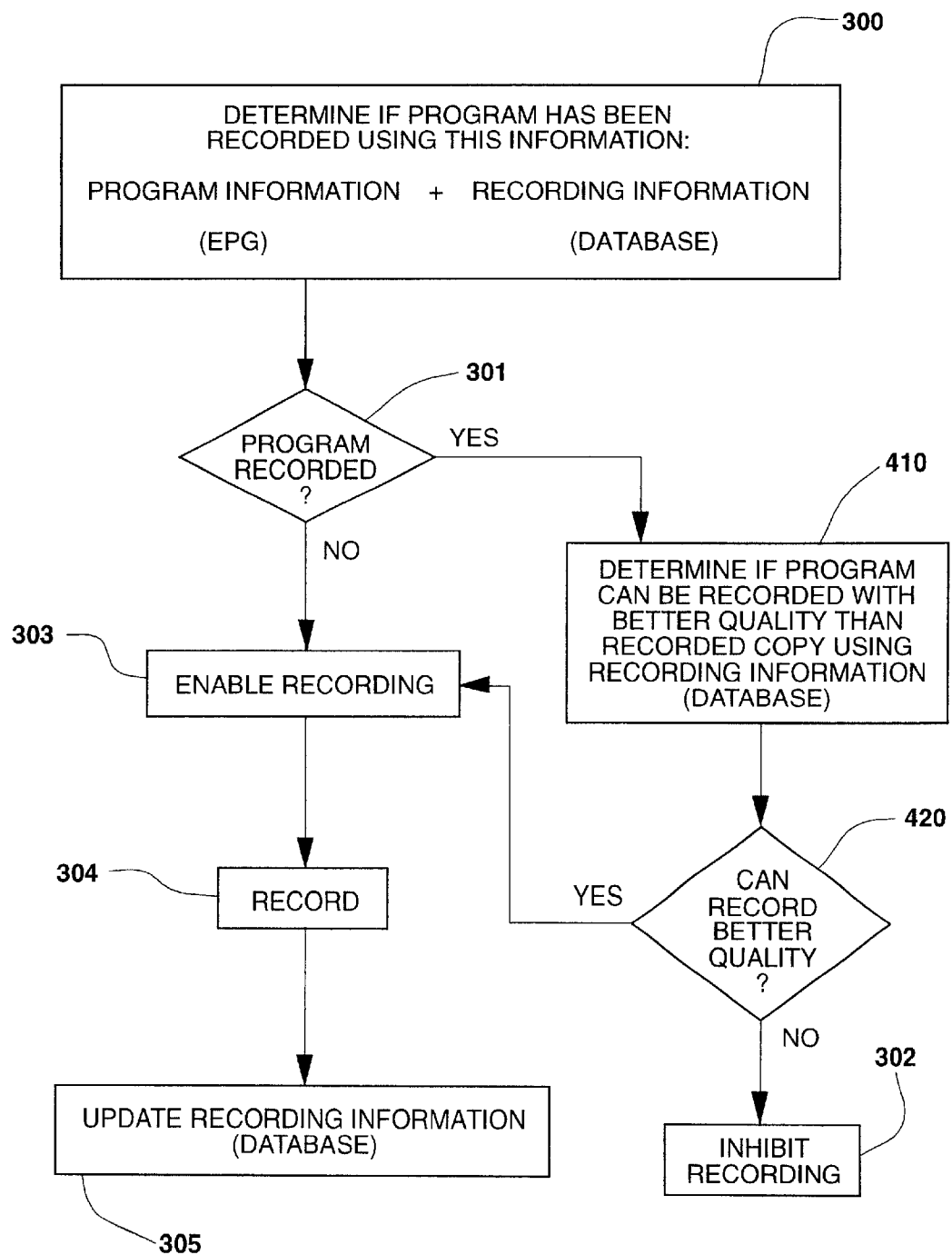
FIG. 4 illustrates a flowchart of another method according to the preferred embodiment of the present invention.

Referring lastly to FIG. 4, a preferred method according to the present invention is illustrated. The embodiment illustrated in FIG. 4 differs from the method illustrated in FIG. 3, in that the method of FIG. 4 may record a second copy of a program, if the second copy can be recorded with a higher quality than the previous copy. To accomplish this, once it is determined in step 301 that a program has been recorded, the method executes step 410, which compares the recording quality of the previously recorded program to the recording quality available for a new recording. The method then proceeds to step 420, which determines, based on the results of the comparison performed in step 410, whether or not a new recording of higher quality can be made. If a higher quality recording can be made, the method continues on to step 303, where recording is enabled. If step 420 determines that a higher quality recording can not be made, then recording is inhibited in step 302. The remaining steps 304 and 305 have been previously discussed.

As an example, suppose that a user records a particular episode of a program on a VCR tape. The user subsequently purchases a DVD recorder/player. If the previously recorded episode airs again, a preferred method according to the present invention will record the episode on DVD, since the quality of the recording can be increased by using a higher quality recording medium. Alternatively, a program stored on a VCR tape from a standard broadcast program will be recorded again, if the program later becomes available for recording from a DVD, because the quality of the recording can be increased by recording from a higher quality source.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–2. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, where the transmitted signal could be a signal propagated through a medium such as an ISDN line, or the signal may be propagated through an air medium and received by a local satellite whereupon being transferred to the computer or information handling system of the preferred embodiment where the signal is a composite signal comprising a carrier signal, and contained within the carrier signal is the desired information including at least one computer program instruction implementing the invention and may be downloaded as such when desired by the user. One skilled in the art would appreciate that the physical storage and/or transfer of the sets of instructions physically changes the medium upon which it is stored electrically, magnetically, or chemically so that the medium carries computer readable information. The invention is limited only by the following claims and their equivalents.

What is claimed is:

1. A program of instructions storable on a medium readable by an information handling system for causing the information handling system to execute steps, the steps comprising:

maintaining episode identification information associated with program information; and identifying, using the episode identification information, a particular episode and its program information;

deciding whether to record a particular episode;

recording the episode if it has been decided that the episode should be recorded;

adding at least the episode identification information of the recorded episode to a database identifying recorded episodes;

said step of adding further comprises adding information regarding at least one of recording quality and reproduction quality of the recorded episode;

said step of deciding comprises querying the database identifying recorded episodes and, if the episode identification information is in the database, determining whether it is possible to record a better copy of the episode; and said step of recording is performed if the episode identification information is in the database and it is possible to record a better copy of the episode.

2. The program of instructions of claim 1, wherein:

said step of deciding comprises querying the database identifying recorded episodes; and said step of recording is inhibited if the episode identification information is in the database identifying recorded episodes.

3. A signal embodied in a propagation medium, for use in a system using program information, comprising:

at least one instruction capable of maintaining episode identification information associated with the program information;

at least one instruction capable of identifying, using the episode identification information, a particular episode and its program information;

at least one instruction capable of determining whether to record a particular episode;

at least one instruction capable of recording the episode if it has been determined that the episode should be recorded;

at least one instruction capable of adding at least the episode identification information of the recorded episode to a database identifying recorded episodes;

said at least one instruction capable of adding further comprises adding information regarding at least one of recording quality and reproduction quality of the recorded episode;

said at least one instruction capable of determining comprises querying the database identifying recorded episodes and, if the episode identification information is in the database, determining whether it is possible to record a better copy of the episode; and said at least one instruction capable of recording initiates recording the episode if the episode identification information is in the database identifying recorded episodes and it is possible to record a better copy of the episode.

4. The signal of claim 3 wherein:

said at least one instruction capable of determining comprises querying the database identifying recorded episodes; and said at least one instruction capable of recording, prevents recording the episode if the episode identification information is in the database identifying recorded episodes.

5. An information handling system employing program information, said information handling system comprising:

at least one processor;

memory operably associated with said processor; and a program of instruction executable by said processor and capable of being stored in said memory, said program of instruction including instructions capable of maintaining episode identification information associated with said program information, and identifying, using the episode identification information, a particular episode and its program information;

instructions capable of determining whether to record a particular episode;

instructions capable of recording the episode if it has been determined that the episode should be recorded;

instructions capable of adding at least the episode identification information of the recorded episode to a database identifying recorded episodes;

said instructions capable of adding, add information regarding at least one of recording quality and reproduction quality of the recorded episode;

said instructions capable of determining queries the database identifying recorded episodes, and if the episode identification information is in the database, determines whether it is possible to record a better copy of the episode; and said instructions capable of recording, record the episode if the episode identification information is in the database and it is possible to record a better copy of the episode.

6. The system of claim 5 wherein:

said instructions capable of determining queries the database identifying recorded episodes; and said instruction capable of recording prevents recording if the episode identification information is in the database identifying recorded episodes.

* * * * *